US008540576B2

(12) United States Patent
Rowe

(10) Patent No.: US 8,540,576 B2
(45) Date of Patent: *Sep. 24, 2013

(54) WIDE AREA PROGRAM DISTRIBUTION AND GAME INFORMATION COMMUNICATION SYSTEM

(75) Inventor: Richard E. Rowe, Las Vegas, NV (US)

(73) Assignee: IGT, Reno, NV (US)

( * ) Notice: Subject to any disclaimer, the term of this patent is extended or adjusted under 35 U.S.C. 154(b) by 1010 days.

This patent is subject to a terminal disclaimer.

(21) Appl. No.: 11/709,981

(22) Filed: Feb. 23, 2007

(65) Prior Publication Data

US 2007/0197298 A1 Aug. 23, 2007

Related U.S. Application Data

(63) Continuation of application No. 09/965,524, filed on Sep. 26, 2001, now Pat. No. 7,186,181.

(60) Provisional application No. 60/266,427, filed on Feb. 2, 2001.

(51) Int. Cl.
*A63F 13/12* (2006.01)

(52) U.S. Cl.
USPC .......................................................... 463/42

(58) Field of Classification Search
USPC ......................... 463/39, 40, 42, 43; 473/409
See application file for complete search history.

(56) References Cited

U.S. PATENT DOCUMENTS 4,335,809 A 6/1982 Wain
4,339,798 A 7/1982 Hedges et al.
4,467,424 A 8/1984 Hedges et al.
4,558,413 A 12/1985 Schmidt
4,572,509 A 2/1986 Sitrick
4,614,342 A 9/1986 Takashima
4,652,998 A 3/1987 Koza et al.
4,760,527 A 7/1988 Sidley
4,788,637 A 11/1988 Tamaru
4,856,787 A 8/1989 Itkis
5,019,963 A 5/1991 Alderon et al.
5,136,644 A 8/1992 Audebert et al.
5,155,837 A 10/1992 Liu et al.

(Continued)

FOREIGN PATENT DOCUMENTS

EP 0 491 595 6/1992
EP 0 491585 6/1992

(Continued)

OTHER PUBLICATIONS

Spielo Gaming International, www.spielo.com, Dec. 6, 2000.

(Continued)

*Primary Examiner* — Dmitry Suhol
*Assistant Examiner* — Jay Trent Liddle
(74) *Attorney, Agent, or Firm* — Foley & Lardner LLP

(57) ABSTRACT

Methods and apparatus are described for distributing gaming applications to a plurality of gaming sites located in a plurality of regulatory regions via a wide area network. Each regulatory region has a regulatory scheme associated therewith. A plurality of gaming applications are stored on at least one central server. A subset of the gaming applications are distributed from the at least one central server to at least one of the gaming sites located in one of regulatory regions via the wide area network, the subset of gaming applications being determined according to the associated regulatory scheme.

18 Claims, 10 Drawing Sheets

(56) References Cited

U.S. PATENT DOCUMENTS

| | | | |
|---|---|---|---|
| 5,155,847 A | 10/1992 | Kirouac et al. | |
| 5,326,104 A | 7/1994 | Pease et al. | |
| 5,359,730 A | 10/1994 | Marron | |
| 5,410,703 A | 4/1995 | Nilsson et al. | |
| 5,421,009 A | 5/1995 | Platt | |
| 5,421,017 A | 5/1995 | Scholz et al. | |
| 5,472,194 A | 12/1995 | Breeding et al. | |
| 5,473,772 A | 12/1995 | Halliwell et al. | |
| 5,555,418 A | 9/1996 | Nilsson et al. | |
| 5,605,334 A | 2/1997 | McCrea, Jr. | |
| 5,605,506 A | 2/1997 | Hoorn et al. | |
| 5,618,232 A | 4/1997 | Martin | |
| 5,643,086 A | 7/1997 | Alcorn et al. | |
| 5,654,746 A | 8/1997 | McMullian, Jr. et al. | |
| 5,655,961 A | 8/1997 | Acres et al. | |
| 5,675,754 A | 10/1997 | King et al. | |
| 5,682,533 A | 10/1997 | Siljestroemer | |
| 5,702,304 A | 12/1997 | Acres et al. | |
| 5,715,462 A | 2/1998 | Iwamoto et al. | |
| 5,724,425 A | 3/1998 | Chang et al. | |
| 5,741,183 A | 4/1998 | Acres et al. | |
| 5,742,829 A | 4/1998 | Davis et al. | |
| 5,752,882 A | 5/1998 | Acres et al. | |
| 5,759,102 A | 6/1998 | Pease et al. | |
| 5,761,647 A * | 6/1998 | Boushy | 705/10 |
| 5,762,552 A | 6/1998 | Vuong et al. | |
| 5,768,382 A | 6/1998 | Schneier et al. | |
| 5,770,533 A | 6/1998 | Franchi | |
| 5,800,269 A | 9/1998 | Holch et al. | |
| 5,809,251 A | 9/1998 | May et al. | |
| 5,812,857 A | 9/1998 | Nelson et al. | |
| 5,816,918 A | 10/1998 | Kelly et al. | |
| 5,820,459 A | 10/1998 | Acres et al. | |
| 5,836,817 A | 11/1998 | Acres et al. | |
| 5,845,077 A | 12/1998 | Fawcett | |
| 5,845,090 A | 12/1998 | Collins, III et al. | |
| 5,848,064 A | 12/1998 | Cowan | |
| 5,851,147 A | 12/1998 | Stupak et al. | |
| 5,851,149 A | 12/1998 | Xidos et al. | |
| 5,870,723 A | 2/1999 | Pare, Jr. et al. | |
| 5,876,284 A | 3/1999 | Acres et al. | |
| 5,885,158 A | 3/1999 | Torango et al. | |
| 5,896,566 A | 4/1999 | Averbuch et al. | |
| 5,905,523 A | 5/1999 | Woodfield et al. | |
| 5,923,249 A | 7/1999 | Muir | |
| 5,923,306 A * | 7/1999 | Smith et al. | 345/2.2 |
| 5,923,885 A | 7/1999 | Johnson et al. | |
| 5,941,947 A | 8/1999 | Brown | |
| 5,944,608 A | 8/1999 | Reed et al. | |
| 5,951,639 A | 9/1999 | MacInnis | |
| 5,970,143 A | 10/1999 | Schneier et al. | |
| 5,974,454 A | 10/1999 | Apfel et al. | |
| 5,980,384 A | 11/1999 | Barrie | |
| 5,999,740 A | 12/1999 | Rowley | |
| 6,006,034 A | 12/1999 | Heath et al. | |
| 6,029,046 A | 2/2000 | Khan et al. | |
| 6,047,128 A | 4/2000 | Zander | |
| 6,047,129 A | 4/2000 | Frye | |
| 6,061,660 A | 5/2000 | Eggleston et al. | |
| 6,068,552 A | 5/2000 | Walker et al. | |
| 6,074,435 A | 6/2000 | Rojestal | |
| 6,077,163 A | 6/2000 | Walker et al. | |
| 6,099,408 A | 8/2000 | Schneier et al. | |
| 6,104,815 A | 8/2000 | Alcorn et al. | |
| 6,106,396 A | 8/2000 | Alcorn et al. | |
| 6,110,041 A | 8/2000 | Walker et al. | |
| 6,135,887 A | 10/2000 | Pease et al. | |
| 6,149,522 A | 11/2000 | Alcorn et al. | |
| 6,154,878 A | 11/2000 | Saboff | |
| 6,178,510 B1 * | 1/2001 | O'Connor et al. | 726/5 |
| 6,203,430 B1 * | 3/2001 | Walker et al. | 463/20 |
| 6,219,836 B1 | 4/2001 | Wells et al. | |
| 6,254,483 B1 | 7/2001 | Acres | |
| 6,263,497 B1 | 7/2001 | Maeda et al. | |
| 6,264,561 B1 | 7/2001 | Saffari et al. | |
| 6,266,810 B1 | 7/2001 | Tanaka et al. | |
| 6,282,709 B1 | 8/2001 | Reha et al. | |
| 6,317,827 B1 | 11/2001 | Cooper | |
| 6,319,125 B1 | 11/2001 | Acres | |
| 6,371,852 B1 | 4/2002 | Acres | |
| 6,409,602 B1 | 6/2002 | Wiltshire et al. | |
| 6,488,585 B1 | 12/2002 | Wells et al. | |
| 6,508,710 B1 * | 1/2003 | Paravia et al. | 463/42 |
| 6,634,946 B1 | 10/2003 | Bridgeman et al. | |
| 6,645,077 B2 | 11/2003 | Rowe | |
| 6,685,567 B2 | 2/2004 | Cockerille et al. | |
| 6,712,693 B1 | 3/2004 | Hettinger | |
| 6,716,102 B2 | 4/2004 | Whitten et al. | |
| 6,805,634 B1 | 10/2004 | Wells et al. | |
| 6,846,238 B2 * | 1/2005 | Wells | 463/39 |
| 6,857,959 B1 | 2/2005 | Nguyen | |
| 6,863,608 B1 | 3/2005 | LeMay et al. | |
| 6,908,387 B2 | 6/2005 | Hedrick et al. | |
| 6,939,226 B1 | 9/2005 | Joshi | |
| 7,033,276 B2 | 4/2006 | Walker et al. | |
| 7,040,987 B2 | 5/2006 | Walker et al. | |
| 7,149,726 B1 | 12/2006 | Lingle et al. | |
| 7,186,181 B2 | 3/2007 | Rowe | |
| 7,379,901 B1 | 5/2008 | Philyaw | |
| 2002/0071557 A1 | 6/2002 | Nguyen | |
| 2002/0137217 A1 | 9/2002 | Rowe | |
| 2002/0138594 A1 | 9/2002 | Rowe | |
| 2002/0142825 A1 | 10/2002 | Lark et al. | |
| 2002/0142846 A1 | 10/2002 | Paulsen | |
| 2002/0151366 A1* | 10/2002 | Walker et al. | 463/42 |
| 2002/0188940 A1 | 12/2002 | Breckner et al. | |
| 2003/0064771 A1 | 4/2003 | Morrow et al. | |
| 2003/0188306 A1 | 10/2003 | Harris et al. | |
| 2004/0002379 A1 | 1/2004 | Parrott et al. | |
| 2004/0048671 A1 | 3/2004 | Rowe | |
| 2004/0127209 A1 | 7/2004 | Riikonen et al. | |
| 2004/0127290 A1 | 7/2004 | Walker et al. | |
| 2004/0147314 A1 | 7/2004 | LeMay et al. | |
| 2004/0180721 A1 | 9/2004 | Rowe | |
| 2005/0153776 A1 | 7/2005 | LeMay et al. | |
| 2005/0176498 A1 | 8/2005 | Nguyen | |
| 2005/0282638 A1 | 12/2005 | Rowe | |
| 2006/0189367 A1 | 8/2006 | Nguyen et al. | |
| 2007/0032288 A1 | 2/2007 | Nelson et al. | |
| 2007/0270212 A1 | 11/2007 | Cockerille et al. | |
| 2008/0045346 A1 | 2/2008 | Nelson et al. | |

FOREIGN PATENT DOCUMENTS

| | | |
|---|---|---|
| EP | 0 689 325 | 12/1995 |
| EP | 0 706 275 | 4/1996 |
| EP | 0 841 615 | 5/1998 |
| EP | 905 614 | 3/1999 |
| EP | 0962900 | 8/1999 |
| EP | 1.001.391 | 5/2000 |
| EP | 1.004.696 | 5/2000 |
| EP | 1 004 969 | 5/2000 |
| EP | 1.004.970 | 5/2000 |
| EP | 1 363 252 | 11/2003 |
| GB | 2 151 054 | 7/1985 |
| WO | WO 01/20424 | 3/2001 |
| WO | WO 02/32526 | 4/2002 |
| WO | WO 02/071726 | 9/2002 |
| WO | WO 03/019486 | 3/2003 |
| WO | WO 2005/022453 | 3/2005 |
| WO | WO 2007/008413 | 1/2007 |
| WO | WO 2008/045699 | 4/2008 |
| WO | WO 2009/018488 | 2/2009 |

OTHER PUBLICATIONS

Oracle Corporation, www.oracle.com/collateral/ent_partioning_fo.pdf, Feb. 1999.

EP Search Report dated Aug. 26, 2005 for related EP application No. 01983154.4 (4 pages).

Hiroaki Higaki, 7 page document entitled, "Group Communication Algorithm for Dynamically Updating in Distributed Systems", Copyright 1994 IEEE International Conference on Parallel and Distributed Systems (pp. 56-62) 0-8186-6555-6/94, higaki@sdesun.slab.ntt.jp.

Steffen Hauptmann, et al., 11 page document entitled, "On-Line Maintenance with On-the-fly Software Replacement", Copyright 1996 IEEE Proceedings, Third International Conference on Configurable Distributed Systems, (pp. 70-80) 0/8186-7395-8/96.
Hiroaki Higaki, 9 page document entitled, "Extended Group Communication Algorithm for Updating Distributed Programs", Copyright 1996, IEEE, International Conference on Parallel and Distributed Systems, 0-8186-7267-6/96, hig@takilab.k.dendai.ac.jp.
Bachar, Yuval, "Method and Apparatus for Implementing an Ethernet Protocol Using Three Wires," U.S. Appl. No. 09/642,192, filed Aug. 18, 2000.
Leyn, Alexander I., "Method and System for Distribution of Clock and Frame Synchronization Information," U.S. Appl. No. 11/064,207, filed Feb. 14, 2001.
EP Search Report dated Aug. 26, 2005 for EP application No. 01983154.4, 4 pages.
Office Action dated Jun. 28, 2005 from U.S. Appl. No. 09/965,524, 10 pages.
International Search Report and Written Opinion from International application No. PCT/US2006/025089, Nov. 2, 2006, 9 pages.
Final Office Action dated Feb. 13, 2006 from U.S. Appl. No. 09/965,524, 6 pages.
Examination Report from Corresponding EP application No. 01983154.4, dated Dec. 20, 2006, 6 pages.
Canadian Office Action dated Jul. 19, 2007 from related Canadian Application No. 2,435,750 3 pages.
Notice of Allowance and Allowed Claims dated Apr. 2, 2008 from related U.S. Appl. No. 10/659,827 16 pages.
US Office Action dated Feb. 28, 2002 issued in U.S. Appl. No. 09/746,944.
US Office Action dated Mar. 12, 2002 issued in U.S. Appl. No. 09/746,944.
US Final Office Action dated Sep. 16, 2002 issued in U.S. Appl. No. 09/746,944.
US Office Action dated Jan. 31, 2003 issued in U.S. Appl. No. 09/746,944.
US Notice of Allowance dated Jun. 13, 2003 issued in U.S. Appl. No. 09/746,944.
US Final Office Action dated Aug. 19, 2009 issued in U.S. Appl. No. 10/785,526.
US Final Office Action dated Feb. 4, 2010 issued in U.S. Appl. No. 10/785,526.
US Final Office Action dated May 27, 2009 issued in U.S. Appl. No. 10/659,827.
US Final Office Action dated Dec. 22, 2009 issued in U.S. Appl. No. 10/659,827.
US Advisory Action dated May 10, 2010 issued in U.S. Appl. No. 10/659,827.
US Examiner's Interview Summary dated Mar. 26, 2010 issued in U.S. Appl. No. 10/659,827.
US Office Action dated Jun. 30, 2009 issued in U.S. Appl. No. 11/176,833.
US Final Office Action dated Feb. 3, 2010 issued in U.S. Appl. No. 11/176,833.
US Office Action dated Oct. 28, 2010 issued in U.S. Appl. No. 11/176,833.
US Office Action dated Sep. 11, 2009 issued in U.S. Appl. No. 11/544,923.
US Final Office Action dated Jan. 27, 2010 issued in U.S. Appl. No. 11/544,923.
US Office Action dated Sep. 15, 2009 issued in U.S. Appl. No. 11/829,789.
Notice of Allowance dated Sep. 13, 2006 issued in U.S. Appl. No. 09/965,524.
AU Office Action dated Oct. 13, 2005 issued in 2002214603, 2 pages.
International Search Report and Written Opinion dated Apr. 20, 2009 issued in PCT/US2008/071830, 15 pgs.
EP Examiner's Report dated Apr. 9, 2009 issued in 06 785 708.6, 6 pgs.
International Preliminary Report on Patentability dated Jan. 17, 2008 issued in PCT/US2006/025089.
Chinese Office Action dated Aug. 30, 2010 issued in CN Application No. 200780044186.9.
EP Office Action dated Aug. 26, 2009 issued in EP Application No. 07843492.5.
International Preliminary Examination Report dated Apr. 7, 2009 issued in PCT/US2007/079901, 6 pages.
Canadian Office Action dated Jan. 6, 2005 issued in No. 2,435,750.
European Office Action dated May 9, 2006 issued in No. 02724890.5.
International Search Report dated Feb. 24, 2003 issued in PCT/US02/02431.
International Preliminary Examination Report dated Apr. 17, 2003, 3 pages.
Claims as allowed for U.S. Appl. No. 09/746,944, Dated Jun. 13, 2003.
US Examiner's Interview Summary dated Feb. 3, 2011 issued in U.S. Appl. No. 11/176,833.
US Final Office Action dated May 13, 2011 issued in U.S. Appl. No. 11/176,833.
US Examiner's Interview Summary dated Sep. 1, 2011 issued in U.S. Appl. No. 11/176,833.
US Office Action Dec. 17, 2010 issued in U.S. Appl. No. 11/544,923.
US Final Office Action May 16, 2011 issued in U.S. Appl. No. 11/544,923.
US Examiner's Interview Summary dated Aug. 23, 2011 issued in U.S. Appl. No. 11/544,923.
Claims as Allowed for U.S. Appl. No. 09/965,524, Dated Sep. 13, 2006.
PCT International Preliminary Report on Patentability and Written Opinion dated Feb. 2, 2010 issued in PCT/US2008/071830.
AU Office Action dated Nov. 8, 2010 issued in 2006269597.
AU Office Action dated Jun. 15, 2011 issued in 2006269597.
AU Office Action dated Jul. 19, 2011 issued in 2007307924.
International Search Report or the Declaration from International Application No. PCT/US01/32368 dated Mar. 25, 2002 (7 pages).
International Preliminary Examination Report from International Application No. PCT/US01/32368 dated Dec. 12, 2002 (4 pages).
PCT Written Opinion from International Application No. PCT/US01/32368 dated Aug. 12, 2002 (5 pages).
International Search Report and Written Opinion from International Application No. PCT/US2007/079901 dated May 7, 2008 (10 pages).
International Search Report or the Declaration from International Application No. PCT/US02/02431 dated Feb. 24, 2003.
Australian Office Action dated Jun. 24, 2008 from AU Application No. 2002255490, 2 pgs.
US Office Action dated Aug. 7, 2008 from U.S. Appl. No. 10/659,827.
Internet Basics: 'How Information Travels Online', 'What Happens When You Go Online', 'Making the Online Connection' and 'How to Download Files', copyright 1996, 12 pages.
Computer Networking from Wikipedia, 14 pages.
International Partial Search Report dated Nov. 6, 2008 from PCT Application No. PCT/US2008/071830, 6 pgs.
US Office Action dated Dec. 11, 2008 from U.S. Appl. No. 10/785,526, 15 pgs.
CA Office Action dated Mar. 2, 2012 issued in CA 2,426,331.
AU Examiner's report No. 3 dated Oct. 7, 2011 issued in 2006269597.
Chinese Second Office Action dated Dec. 7, 2011 issued in CN Application No. 200780044186.9.
Australian Examiner's first report dated Apr. 1, 2009 issued in No. 2008202926.
Canadian Office Action dated Mar. 9, 2010 issued in 2,435,750.

* cited by examiner

WIDE AREA PROGRAM DISTRIBUTION AND GAME INFORMATION COMMUNICATION SYSTEM

The present application is a continuation and claims priority from co-pending U.S. patent application Ser. No. 09/965,524 for WIDE AREA PROGRAM DISTRIBUTION AND GAME INFORMATION COMMUNICATION SYSTEM filed on Sep. 26, 2001, which claimed priority from U.S. Provisional Patent Application No. 60/266,427 for WIDE AREA PROGRAM DISTRIBUTION AND GAME INFORMATION COMMUNICATION SYSTEM filed on Feb. 2, 2001, each of which is incorporated herein by reference for all purposes.

BACKGROUND OF THE INVENTION

This invention relates to gaming networks including gaming machines such as video slot machines and video poker machines. More specifically, the present invention provides methods and apparatus for distributing gaming applications and related information over a wide area network such as, for example, the Internet or World Wide Web.

Typically, a master gaming controller in a gaming machine controls various combinations of devices that allow a player to play a game on the gaming machine and encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

When implementing the gaming features described above on a gaming machine using architectures utilized in the personal computer industry, a number of requirements unique to the gaming industry must be considered. One such requirement is the regulation of gaming software. Typically, within a geographic area allowing gaming, i.e., a gaming jurisdiction, a regulatory body is charged with regulating the games played in the gaming jurisdiction to ensure fairness and prevent cheating. In most gaming jurisdictions there are stringent regulatory restrictions for gaming machines requiring a time consuming approval process of new gaming software and any software modifications to gaming software used on a gaming machine. A regulatory scheme also typically includes field verification of deployed gaming applications to ensure that a deployed game corresponds to the certified version of the game.

In the past, to implement the play of a game on a gaming machine, a monolithic software architecture has been used. In a monolithic software architecture, a single gaming software executable is developed. The single executable is typically burnt into an EPROM and then submitted to various gaming jurisdictions for approval. After the gaming application is approved, a unique checksum is determined for the gaming application stored in the EPROM for the purpose of uniquely identifying the approved version of the gaming application.

A disadvantage of a monolithic programming architecture is that a single executable that works for many different applications can be quite large. For instance, gaming rules may vary from jurisdiction to jurisdiction. Thus, either a single custom executable can be developed for each jurisdiction or one large executable with additional logic can be developed that is valid in many jurisdictions. The customization process may be time consuming and inefficient. For instance, upgrading the gaming software may require developing new executables for each jurisdiction, submitting the executables for reapproval, and then replacing or reprogramming EPROMs in each gaming machine.

By contrast, software architectures for use by personal computers have moved toward an object oriented approach where different software objects may be dynamically linked together prior to or during execution to create many different combinations of executables that perform different functions. Thus, for example, to account for differences in gaming rules between different gaming jurisdictions, gaming software objects appropriate to a particular gaming jurisdiction may be linked at run-time which is simpler than creating a single different executable for each jurisdiction. Also, object oriented software architectures simplify the process of upgrading software since a software object, which usually represents only a small portion of the software, may be upgraded rather than the entire software.

Another disadvantage of the monolithic architecture approach relates to the logistics of distributing gaming applications. That is, because each gaming application for each gaming machine typically is embodied in a separate memory device, i.e., an EPROM, these EPROMs must be transported from the gaming application provider, e.g., International Game Technology, to the gaming venues, e.g., casinos, and manually installed in each of the hundreds of gaming machines at each venue. The amount of resources consumed by this process is exacerbated by the fact that many new games are introduced each year.

Techniques for distributing gaming applications within a single gaming venue have been proposed which take advantage of the object-oriented software architectures described above as well as advances in networking technologies. According to such techniques, gaming machines in a casino may be interconnected using any of a variety of network topologies with one or more servers which transmit all or portions of gaming applications to the interconnected machines using any of a variety of network transmission protocols. An example of such a gaming venue network is described in commonly assigned, copending U.S. patent application Ser. No. 09/746,944 for GAMING TERMINAL DATA REPOSITORY AND INFORMATION DISTRIBUTION SYSTEM, now U.S. Pat. No. 6,645,077, filed on Dec. 21, 2000, the entire disclosure of which is incorporated herein by reference for all purposes.

Unfortunately, single venue gaming networks still do not adequately address the logistical issues associated with the distribution of gaming applications from the gaming application provider to the gaming venues, or the complications associated with complying with a multiplicity of regulatory schemes. Thus, there is a need for techniques by which the distribution of gaming applications may be made more efficient.

SUMMARY OF THE INVENTION

According to the present invention, methods and apparatus are provided for distributing gaming applications to a plurality of gaming sites located in a plurality of regulatory regions via a wide area network. Each regulatory region has a regulatory scheme associated therewith. A plurality of gaming applications are stored on at least one central server. A subset of the gaming applications are distributed from the at least one central server to at least one of the gaming sites located in one of regulatory regions via the wide area network, the subset of gaming applications being determined according to the associated regulatory scheme.

According to other specific embodiments, methods and apparatus are provided for distributing gaming applications to a plurality of gaming sites located in at least one regulatory region via a wide area network. Each regulatory region has a regulatory scheme associated therewith. A plurality of gaming applications are stored on at least one central server. A subset of the gaming applications are uploaded to at least one regional server associated with each regulatory region via the wide area network. The subset of gaming applications associated with each regulatory region is determined according to the associated regulatory scheme. A portion of the subset of gaming applications is distributed via the wide area network from either of the at least one regional server and the at least one central server to at least one of the gaming sites located in the regulatory region associated with the at least one regional server.

A further understanding of the nature and advantages of the present invention may be realized by reference to the remaining portions of the specification and the drawings.

DETAILED DESCRIPTION OF SPECIFIC EMBODIMENTS

The present invention takes advantage of advances in networking technology to provide techniques by which gaming applications may be efficiently distributed to geographically remote gaming sites. According to various embodiments of the invention, authorized users at gaming sites are given access to gaming applications in accordance with the regulatory scheme associated with the geographic region in which the gaming site is located. For the purpose of illustrating specific embodiments of the invention, an exemplary game data repository associated with a gaming site and to which gaming applications may be downloaded is shown in and described with reference to FIG. 1. For similar purposes, the structure of an exemplary gaming application is described with reference to FIG. 2. It will be understood, however, that many different types of gaming sites and gaming application architectures may be employed with various embodiments without departing from the scope the present invention.

Figure 1:
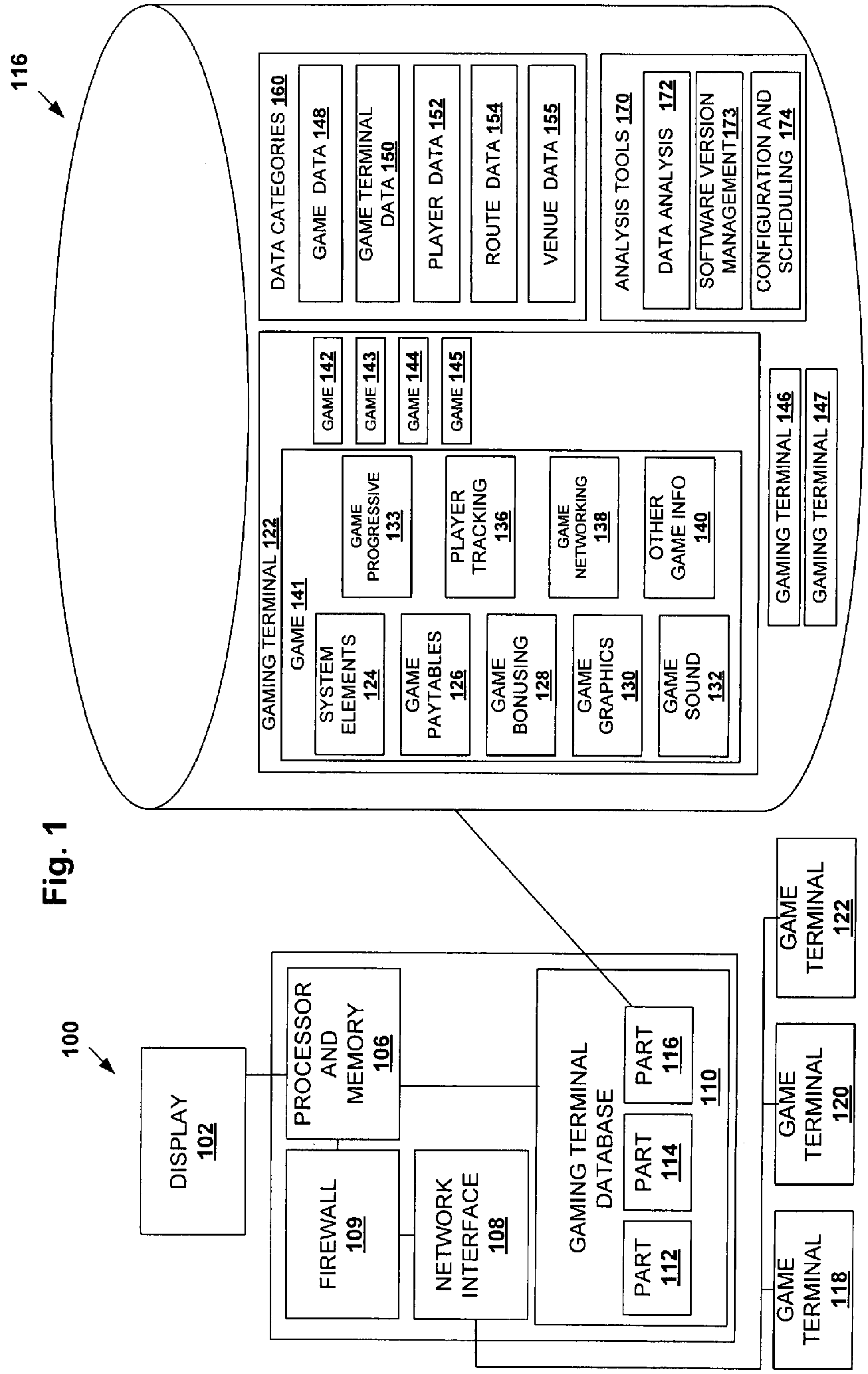
FIG. 1 is a block diagram depicting a gaming terminal data repository connected to a number of gaming terminals and a partition of a database residing within the gaming terminal data repository.

FIG. 1 is a block diagram of a gaming terminal data repository (GTDR) 100 connected via network interface 108 to a number of remote gaming terminals 118, 120 and 122. The GTDR 100 may provide the management and download tools necessary to manage all of the information associated with a particular gaming terminal or groups of gaming terminals and manage access to this data for a particular user or set of users. An operator using the GTDR 100, with the appropriate access privileges, may define various parameters that trigger the download to the gaming terminal of information and programs such as game software components. The GTDR 100 may connect with an existing network interface system, such as a cashless system within the casino, may communicate directly with gaming terminals or may use combinations of both methods to facilitate information downloading and data collection. According to various embodiments of the present invention, GTDR 100 may also connect to remote servers via a wide area network, e.g., the Internet or World Wide Web, for the purpose of downloading gaming applications for distribution to and use on gaming terminals 118, 120, and 122.

The gaming terminals 118, 120, and 122 may be gaming machines such as video and mechanical slot machines and or gaming terminals providing video game play for games such as bingo games, keno games and lottery games. The gaming terminals may be located in many different venues such as casinos, stores, restaurants, bars and boats.

The gaming terminals 118, 120 and 122 may send game transaction information, such as coin-in and coin-out, game software component information, such as the versions of software residing on each gaming terminal and the version of a game being played, and player tracking information, such as the identity of a player playing a game on the gaming machine. The gaming terminals 118, 120 and 122 may send and may receive information directly from the GTDR 100 or the gaming terminals may communicate with the GTDR 100 via an intermediate device such as a cashless system server. Information received from the gaming terminals may be archived in the gaming terminal database 110 on the GTDR. In addition, the GTDR 100 may poll various servers such as bonus game servers, cashless system servers, progressive game servers for gaming information that may stored in the gaming terminal database 110.

The GTDR 100 may communicate with the gaming terminals, 118, 120 and 122 and other remote gaming devices, such as portable computers, printers, personal digital assistants and computers using the network interface 108. The network interface 108 may be a wireless network interface or wired network interface. The GTDR 100 may utilize a firewall 109 to prevent unauthorized access to data stored in the GTDR 100. Access firewalls may provided by Cisco Systems (San Jose, Calif.).

The GTDR 100 stores gaming information, such as gaming transaction information, game software components and game software component information, in a partitioned gaming terminal database 110. In one embodiment, the information stored in the gaming terminal database may be partitioned according to gaming entities. For instance, gaming information from a first gaming entity be may stored in a first partition of the gaming terminal database 112, gaming information from a second gaming entity may be stored in a second partition 114 and gaming information from a third gaming entity may be in a third partition 116. The number of partitions may vary and is not limited to the three partitions described in the present example. The gaming terminal database 110 may be a hard drive, CD-Read/Write drive or any other storage medium or combinations of storage mediums appropriate for storing large amounts of game information.

The large amount data and variety of game programs on each gaming terminal may be managed using the data and program management tools of the GTDR 100. Each game program may comprise of plurality of game software components. In FIG. 1, each of the items may be associated with a particular gaming terminal or associated with a type of gaming terminal. The items may be organized in a database structure of some type which may be extended to a large number of gaming terminals. Many different types of database structures are possible. Some examples of database structures which may be utilized are described in the text "Database Management Systems," R. Ramakrishnan, Mcgraw-Hill, which is incorporated herein by reference in its entirety and for all purposes.

An advantage of using a database partitioned according to a number of gaming entities may be easier sharing of data between gaming entities allowing for seamless game play across different gaming entities and promotions involving multiple gaming entities. Another advantage may be less expensive information management costs because multiple gaming entities may share the information management costs rather than each entity performing its own information management. Further, within a gaming entity, information management costs may be lowered because information management for a particular entity may be centralized. Yet another advantage of the partitioned database is scalability. The partitioned approach is scaleable to large numbers of gaming terminals. Further, when gaming information is stored for a large number of gaming terminals, gaming terminal configuration performance patterns may emerge that are not readily seen when information is only stored for a small number of gaming terminals.

The associations between gaming terminal database elements and the gaming terminals may be managed and leveraged with specific GTDR 100 tools that utilize information that may be stored in the data repository such as within a database structure of some type. For instance, the system may be used to establish relationships between users, terminal information, site information, and gaming terminals. With a given set of relationships established using the system, the casino operator may then identify the configuration desired of a particular gaming terminal or groups of gaming terminals. An example of the structure, relationships and types of information that may be stored in a data partition 116 for a particular gaming entity is shown in the FIG. 1. The example is used for illustrative purposes as many different structures are possible and additional gaming information may be stored in the database 110.

For each gaming terminal, including 122, 146 and 147, game software component information for various potential game configurations on the gaming terminal may be stored. For instance, gaming terminal 122 may be configured for 5 different types of games including 141, 142, 143, 144 and 145. The 5 games might correspond to five types of video slot games, 5 types of video poker games, or 2 types of video slot games and 3 types of video black jack games. The number of games on a given terminal and the combinations of games may vary. Game software components and game software component information for other video games of chance, including video bingo games, video lottery games, mechanical slot games, video keno games, video checkers and video card games may also be stored in the GTDR 100.

For each game, game software component information may be listed for game software components that reside on the gaming terminal. The game software component information may correspond to a particular game software configuration residing on the gaming terminal as well as potential configurations of software for the gaming terminal. For example, for game 141, the game software component information includes game system components 124, game paytables 126, game bonusing 128, game graphics 130, game sounds 132, game progressives 133, jurisdiction information 134, player tracking 136, game networking components 138 and other gaming information. Under each category, multiple different game software components may be available. Some of the game software components, such as game graphics 130 or game sounds 132, may be specific to a particular game while other game software components, such as game networking 138, may be shared by multiple different games. For instance, a video slot game and a poker game may use different graphics and sounds but the same player tracking software components. Examples of different game software components for each type of game software component are described with reference to FIG. 2.

The GTDR 100 may receive various types of game transaction information from gaming terminals connected in some manner to the GTDR 100. The game transaction information may be used to determine the relative performance of different games and gaming terminals. The game transaction information may be stored in a relational database allowing search and queries of various different data categories 160. The data categories may be specify various data relationships. For instance, game transaction information, such as coin-in, coin-out, and amount bet per game, may be stored according to specific games as game data 148. The game data may be a composite of game data obtained from multiple gaming terminals operating at different locations. Many data fields may be associated with the game data such as the time, game version, location, gaming terminal and player, and stored as a data record. The data fields may be utilized by analysis tools residing in the GTDR 100 to generate various information relationships such as game performance as a function of time, game performance as a function of location, game performance as a function of game version and game performance as a function of player.

The data categories 160 may be used to store commonly accessed data combinations to minimize analysis times.

Many different combinations of game transaction information and other game information for various groups of gaming terminals may be stored in the gaming terminal database 110 as a queryable database. Other examples of game data categories may include: 1) gaming terminal data 150, which may be a history of game performance on a particular gaming terminal for all of its past configuration, 2) player data 152, which may be a composite of a player's game play on many different gaming terminals, 3) route data 154 which may be a composite of gaming terminal information for a group of gaming terminals on a route comprising a number of gaming venues such as stores and 4) venue data 155 which may be a composite of terminal information for a groups of gaming terminals at a particular venue such as a casino, a subset of gaming terminals within a casino, a store or a restaurant. Again many types of data categories may be possible. The number of potential data categories may depend on the number of fields associated with each data record obtained from a gaming terminal and a processing power of the GTDR 100 because too many data categories may result in a degradation of search performance on the GTDR 100.

The processor and memory 106 on the GTDR 100 may be used to execute a number of analysis tools 170 (e.g., gaming repository applications) residing in each data partition, including 112, 114 and 116 in the gaming terminal database 110. The gaming repository applications 170 as well as the game transaction information and game software components stored in the gaming terminal database 110, may be proprietary and in some cases may not be shared by different gaming entities. The analysis tools 170 may utilize a number of user interfaces such as graphics tools for presenting data generated in each application. For instance, an interface may display the current game software components on a gaming terminal as highlighted in a list of game software components available on the gaming terminal. These interfaces may be viewed on displays, including 102, or remote computers which are connected to the GTDR 100.

The gaming repository applications 170 may include: 1) data analysis applications 172, which may be used to establish data categories and various relationships between data categories, 2) version management tools 173, which may be used to identify the game software components on a particular gaming terminal and then update one or more game software components by downloading game software components from the GTDR 100, 3) configuration and scheduling tools 174, which may be used to automatically configure one or more gaming terminals according to one or more scheduled update triggers, 4) query configuration application, which may be used to design query relationships in the database that are suited to a particular users needs and 5) report generation applications for formatting game transaction information. The gaming repository application 170 are not limited to these applications and many types of gaming repository applications are possible.

Data from the various applications executed on the GTDR 100 may be shared and utilized by other applications. For instance, the data analysis tools 172 may be used to establish relationships between game versions, game transaction information, site information and gaming terminal information. The relationships may be utilized by the configuration application 174 to establish configurations for one or more gaming terminals. The configuration application may identify the current set of game software components used for game play on a particular gaming terminal and then compare the identified software components with game software components required for a new game configuration (e.g., a plurality of game software components are used to present a game presentation on each game presentation). The result of the comparison may be a list of game software components that need to be updated on the gaming terminal to enable the new game configuration. The configuration management tool 174, which is executed by the processor 106, may then download the game software components required for the new game configuration to the gaming terminal via the network interface 108. A similar process may be used by the software version management to update versions of software residing on one or more gaming terminals.

The scheduling tools may be used to automatically update the configurations of one or more gaming terminals according to a number of update triggers. Updates might be triggered at certain times, such as hourly, daily or weekly, according to player input, or according to game performance. For instance, when a game is performing poorly on a gaming terminal, game software components to enable a new version of the game being played or a different game may be downloaded to the gaming terminals connected to the GTDR 100. The gaming performance of the gaming terminals may be monitored by the GTDR 100 so that the download may be performed automatically. As another example, different paytables may be downloaded to different gaming terminals at specific times of the day to encourage game play during off-peak hours or increase profits during peak hours. Yet another example, the GTDR may download new game software components to a particular gaming terminal being utilized by a particular player. The download may occur as a result of a data analysis indicating personal game playing preferences of a particular player such as liking particular sounds or graphics. The download may occur automatically without being initiated by the player or may be initiated by the player.

In the past new games have been installed in gaming machines by exchanging an EPROM in the gaming machine containing all of the gaming software or by downloading an entire game software package. In these examples, all the gaming software on the gaming machine is exchanged whether or not it is different from the new gaming software. An advantage of only downloading specific game software components is that it allows for faster downloads when only a small fraction of the gaming software is being updated. Also, in many cases, the gaming machine may continue to operate while the download is implemented. When all of the gaming machine software is downloaded, the gaming machine may have to brought down for the installation. Further, for a game with many different versions where the variation from version to version may be small, it is more efficient to manage and store the individual game software components rather than many different game software versions with each version comprising all of the game software components.

Figure 2:
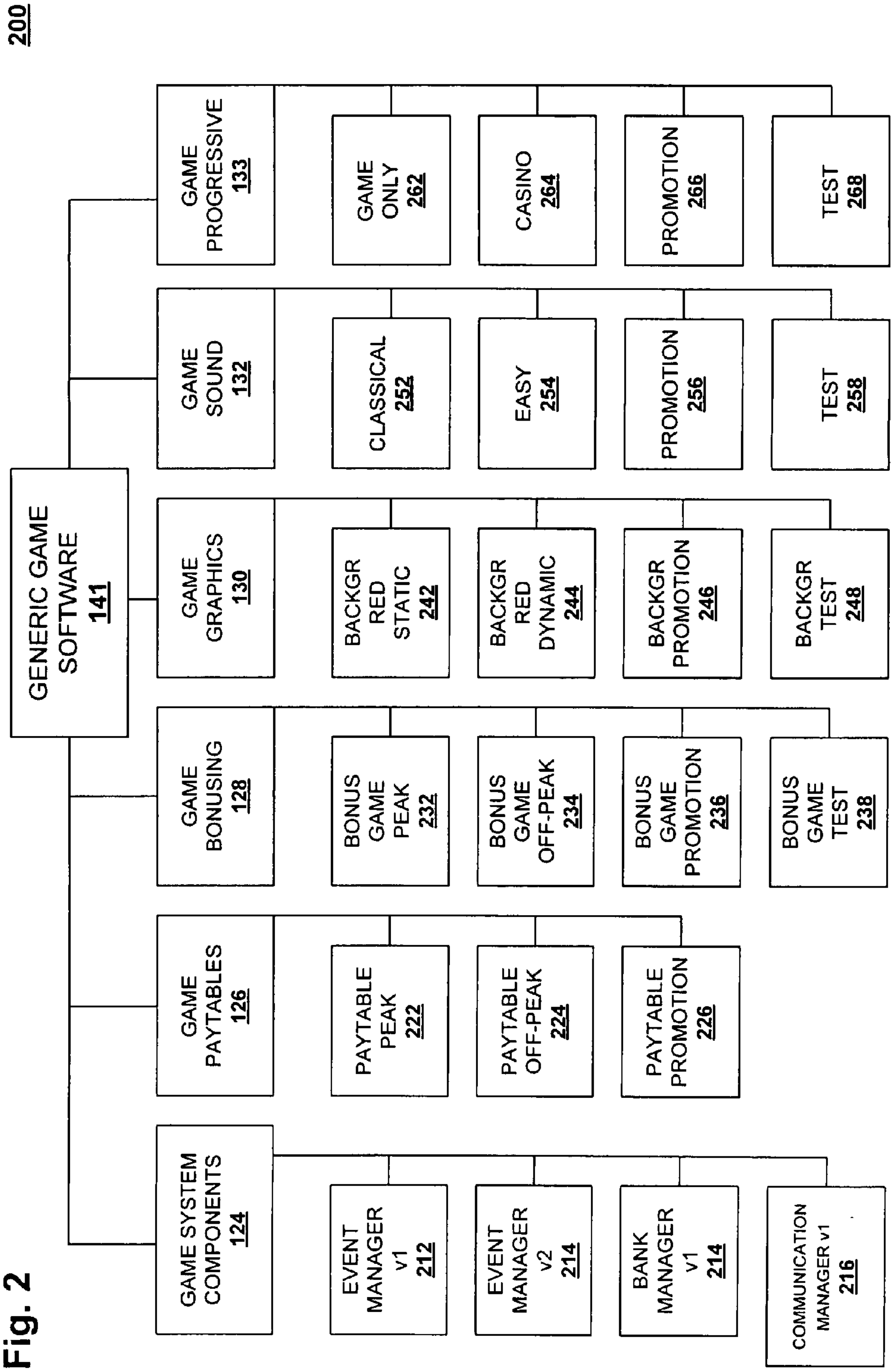
FIG. 2 is block diagram of game software components that may be allocated to particular gaming terminals using a gaming terminal data repository.

FIG. 2 is block diagram of game software components that may be allocated to particular gaming terminals using a gaming terminal data repository 100. An example of game software components for a particular game 141 was described with reference to FIG. 1 and components that appear in FIG. 1 are identified by common reference numerals. In FIG. 2, the game software components 200 may be displayed as menu containing game software component information. The menu, which may be generated as part of game repository application, may be used by an operator using the GTDR 100 to configure a particular gaming terminal connected to the GTDR with a particular game. The menu items may correspond to game software components stored on the GTDR 100.

The game system components 124 may comprise software modules used to provide various system functions on the gaming terminal. For instance, the event manager 212 may be used to monitor and distribute events occurring on the gaming machine such as card-in, card-out, power hit and tilt. The bank manager 215 may be used to perform accounting functions on the gaming terminal. The communication manager 216 may be used to provide communication protocols allowing different gaming devices to communicate with the gaming terminal such as player tracking devices. Another example of gaming system components might include device drivers allowing the gaming system software to communicate with various devices connected to the gaming terminal such as displays, bill validators, ticket readers, coin acceptors, card readers and printers.

Different versions of the game system components may be stored on the GTDR 100. For instance, two versions of the event manager, 212 and 215, may be stored on the GTDR 100. The second version may be a software update of the first version. Using the GTDR 100, software versions on one or more gaming terminals may be automatically updated. In addition, the GTDR may store device drivers for many types of devices. For example, many different versions of player tracking devices exist. The GTDR 100 may store device drivers for these devices such that, when a new player tracking device is installed on a gaming terminal, the GTDR 100 may be used to download software to the gaming terminal enabling operation of the new player tracking device.

The game paytables 126, which may be downloaded to a gaming terminal, includes a paytable peak 222, a paytable off-peak 224 and a paytable promotion 226. The paytable peak 222 may correspond to a particular set of odds for peak game playing times. Paytable off-peak may correspond to a particular set of odds for off-peak playing times 224. For instance, during off-peak playing times, a bigger jackpot may be available on certain gaming terminals that is not available during peak game playing times to attract additional game play. The paytable promotion 226 may correspond to a particular set of prizes that is available during promotional periods. For example, the paytable promotion might be downloaded at random times during the day to add excitement to game play on one or more gaming terminals. The GTDR 100 may include configuration and scheduling applications allowing random downloads to be performed automatically.

The game bonusing 128, which may be downloaded to a gaming terminal, include bonus game peak 232, bonus game off-peak 234, bonus game promotion 236 and bonus game test 238. A large variety of bonus games are possible. The bonus game peak and bonus game off-peak may have been selected based upon game performance data stored on the GTDR. The bonus game test 238 may be downloaded to gather gaming performance data on a particular bonus game, e.g., to try out a new bonus game that has been developed.

The game graphics 130 and game sound 132, which may be downloaded from the GTDR, include background red static 242, background red dynamic 244, background promotion 246, background test 248, classical 252, easy 254, promotion 256 and test 258. The GTDR 100 may contain analysis tools that allow the game graphics and game sounds on a group of gaming terminals to be directed to a particular age group. For example, older men may prefer a red dynamic background 244 and classical music 252 while older women may prefer a red static background 242 and easy music 254. Thus, the GTDR 100 may include scheduling tools that use update triggers such as the time of day to automatically download game graphics 130 and game sound 132 to attract particular groups of people at certain times of day.

Specific update triggers may be determined based upon a demographic analysis of game performance data (e.g. game transaction information) and user data (e.g. player tracking information) stored in the GTDR. The demographic analysis may be performed using software executed on the GTDR. The software may indicate that certain groups of individuals are more likely to play certain types of games at certain times of day. Thus, update triggers may be developed and implemented on the GTDR that configure gaming terminals with certain games at certain times corresponding to the preferences of a particular demographic group.

The game progressive 133 game software components may allow a user to configure groups of gaming terminals into different progressive game groups. For instance, the game only progressive software 262 may be downloaded from the GTDR 100 to a group of gaming terminals presenting the same game such as a particular version of a video slot game. The game only progressive 262 may enable a progressive game for game players playing only the particular version of the slot game designated by the game only progressive 262. As another example, a casino progressive software may allow a gaming terminal to be configured as part of casino wide progressive game involving a number of gaming terminals throughout the casino. Also, promotional progressive games 266 and test progressive games 268 may be downloaded from the GTDR 100.

The game software components 200 listed in the FIG. 2 may appear to the operator as a menu on a display screen where the current game software configuration of the gaming terminal is highlighted in some manner. For instance, a current game software configuration may comprise: 1) a first versions of the event manager 212, bank manager 214, and communication manager 216, 2) a bonus peak game 232, 3) a red dynamic background 244, 4) easy music 254, and 5) a game only progressive 262. The current game software configuration may be highlighted on the screen as a particular color. By pointing to the screen using a mouse or some other device, an operator may highlight particular boxes to adjust the configuration of a particular gaming terminal or a group of gaming terminals. In addition, the menu may include configuration templates corresponding to a number of gaming terminal configuration options that may be selected by the operator. These templates may be proprietary and based upon an analysis of game performance data available to a particular gaming entity.

Various embodiments of the present invention will now be described with reference to FIGS. 3-7. Various ones of these embodiments may be used to effect the efficient distribution of gaming applications among gaming sites, exemplary descriptions of such applications and sites being provided above with reference to FIGS. 1 and 2. It will be understood, however, that neither the specific features of the gaming applications, application components, and gaming data repository described above, nor the details of the exemplary network architectures and data transmission mechanisms described below should be used to unduly limit the scope of the present invention.

Figure 3:
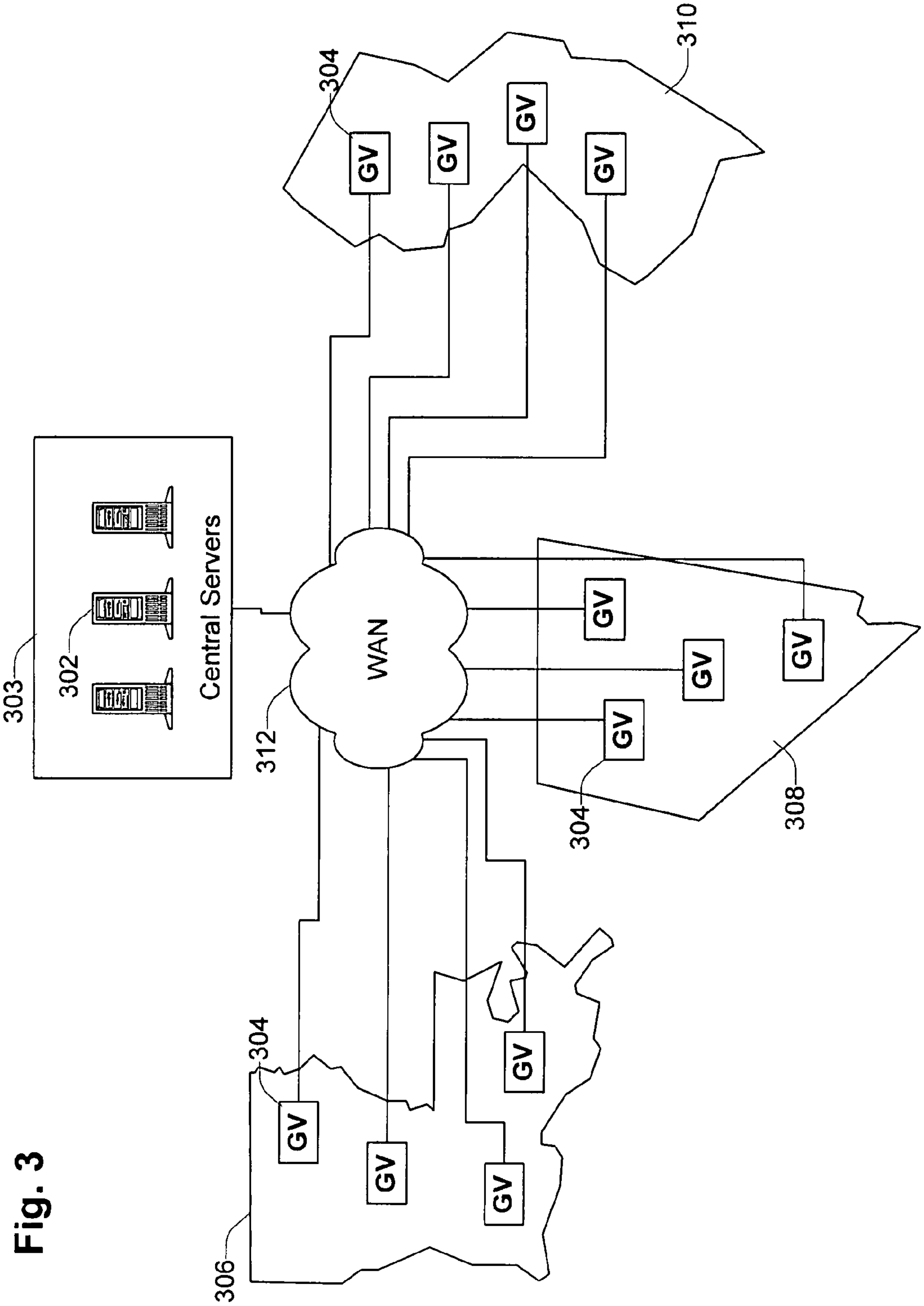
FIG. 3 is a block diagram of a wide area network in which a specific embodiment of the present invention may be implemented.
Figure 4:
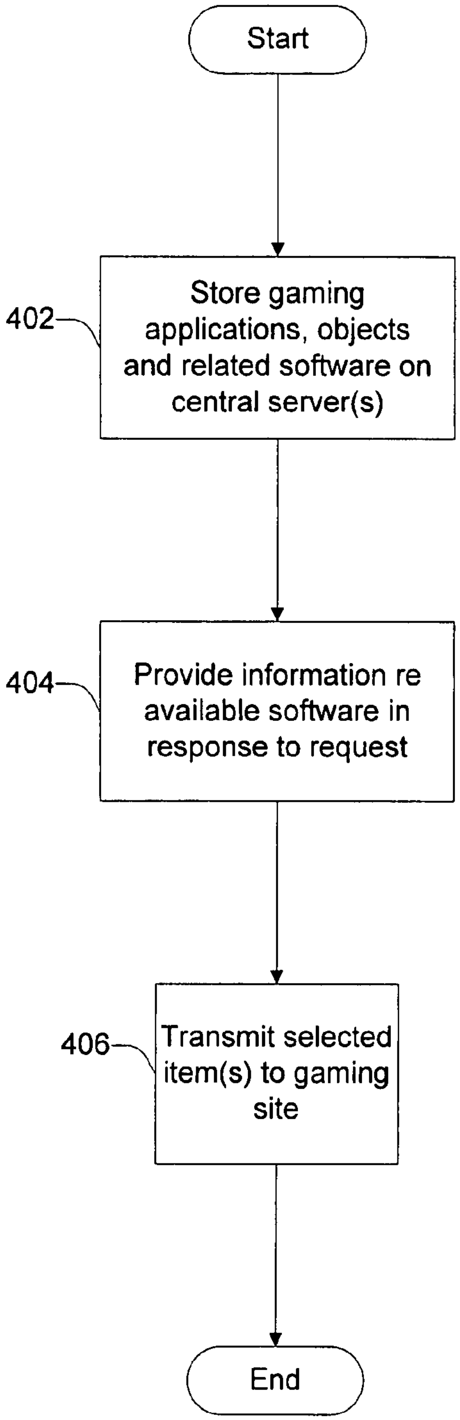
FIG. 4 is a flowchart illustrating operation of a specific embodiment of the invention in the network environment of FIG. 3.

FIG. 3 is a block diagram of a wide area network in which various specific embodiments of the present invention may be implemented. FIG. 4 is a flowchart illustrating operation of such exemplary embodiments. According to such embodiments, gaming applications, application components, analysis tools, and a variety of gaming-related software and software objects are stored on one or more central servers 302 for distribution to gaming venues (GV) 304 in one or more gaming jurisdictions 306, 308, and 310 (e.g., Louisiana, Nevada, New Jersey) via wide area network (WAN) 312. The information available for download may include any of the applications or objects discussed above with reference to FIGS. 1 and 2, as well as any of a variety of other gaming related software. Server(s) 302 may be located at one or more facilities 303 operated by, for example, a gaming application provider such as International Game Technology (IGT) of Reno, Nev. Gaming venues 304 may comprise any of a variety of gaming providers such as, for example, casinos or any other "brick and mortar" gaming venue, or gaming sites on the Internet or World Wide Web.

According to various embodiments and as will be understood, WAN 312 can represent a wide variety of network topologies, only some of which correspond to the Internet and World Wide Web. For example, WAN 312 may comprise any combination of public and private LANs or WANs which employ any of a wide variety of network communication protocols (e.g., TCP/IP) or combinations thereof.

Access by authorized users at GVs 304 to the various applications, applets, and software objects on server(s) 302 is controlled according to the regulatory scheme associated with the gaming jurisdiction in which each GV 304 is located. The manner in which such access is controlled may vary according to different embodiments. For example, if an incoming request is determined to come from a particular gaming jurisdiction (e.g., by parsing the request), only information relating to applications and objects appropriate for that jurisdiction are presented to the requester. For example, several different versions of the base gaming application "Little Green Men" from IGT may reside on server(s) 302, each of which is specifically tailored to the regulations in a particular gaming jurisdiction. Moreover, a variety of associated objects such as paytables, bonus game options, glass display data, etc., may also be jurisdiction-specific. According to one embodiment, only the applications, applets, and objects which are appropriate for the jurisdiction from which a request emanates are presented to the requester as options for selection and download. Alternatively, all of the available applications, applets, and software objects might be presented to the requester with accompanying identifiers to indicate which may be downloaded for a particular jurisdiction. According to such an embodiment, when a requester selects an inappropriate item, the download would be inhibited and an appropriate message presented.

Referring now to FIG. 4 and as mentioned above, gaming and gaming-related applications and objects are provided on one or more central servers for distribution to any of a plurality of gaming venues in any of a plurality of gaming jurisdictions (402). In response to a request from a first gaming venue in a first gaming jurisdiction, information relating to available gaming applications, objects and related software is provided to the requester at the gaming venue via an intervening WAN (404). As mentioned above, the communication protocol according to which information is transmitted back and forth between the central server(s) and the gaming venues may be any of a wide variety of well known or proprietary protocols.

In response to selection of one or more gaming applications or software objects for download by the user at the gaming venue, the selected item(s) is/are transmitted to the gaming venue (406) to be stored, for example, in a game data repository (e.g., GTDR 100 of FIG. 1) for distribution to a plurality of gaming terminals, or on a server which provides gaming applications over a network. As discussed above, access to the downloadable information on the central server(s) is controlled according to the regulations of the gaming jurisdiction in which the gaming venue from which the request was generated is located. This control may occur, for example, in the presentation of the available downloadable items to the requesting user, or in some other way, e.g., the prohibition of the selection or download of items not appropriate for the particular jurisdiction.

Figure 5:
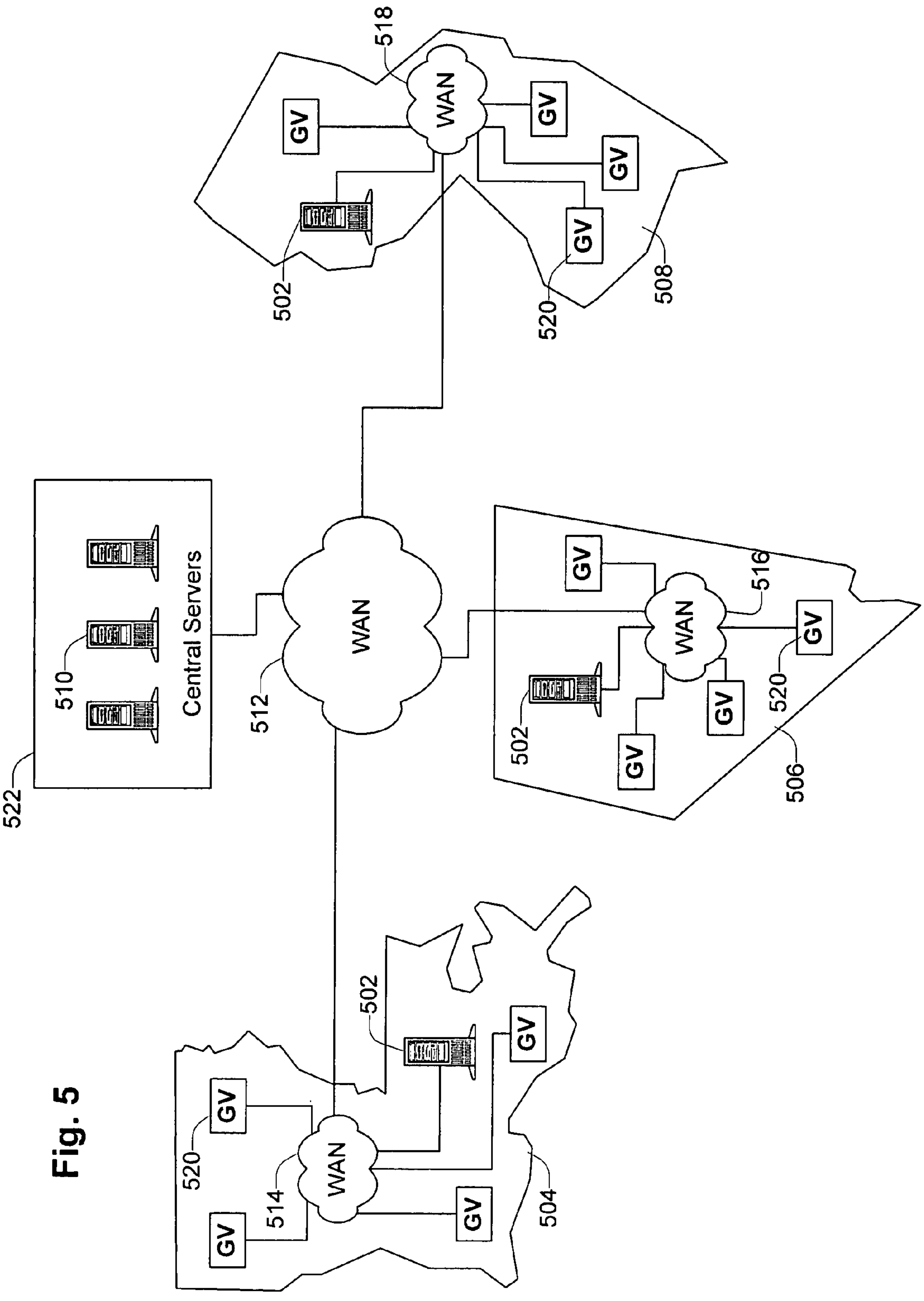
FIG. 5 is a block diagram of a wide area network in which another specific embodiment of the present invention may be implemented.
Figure 6:
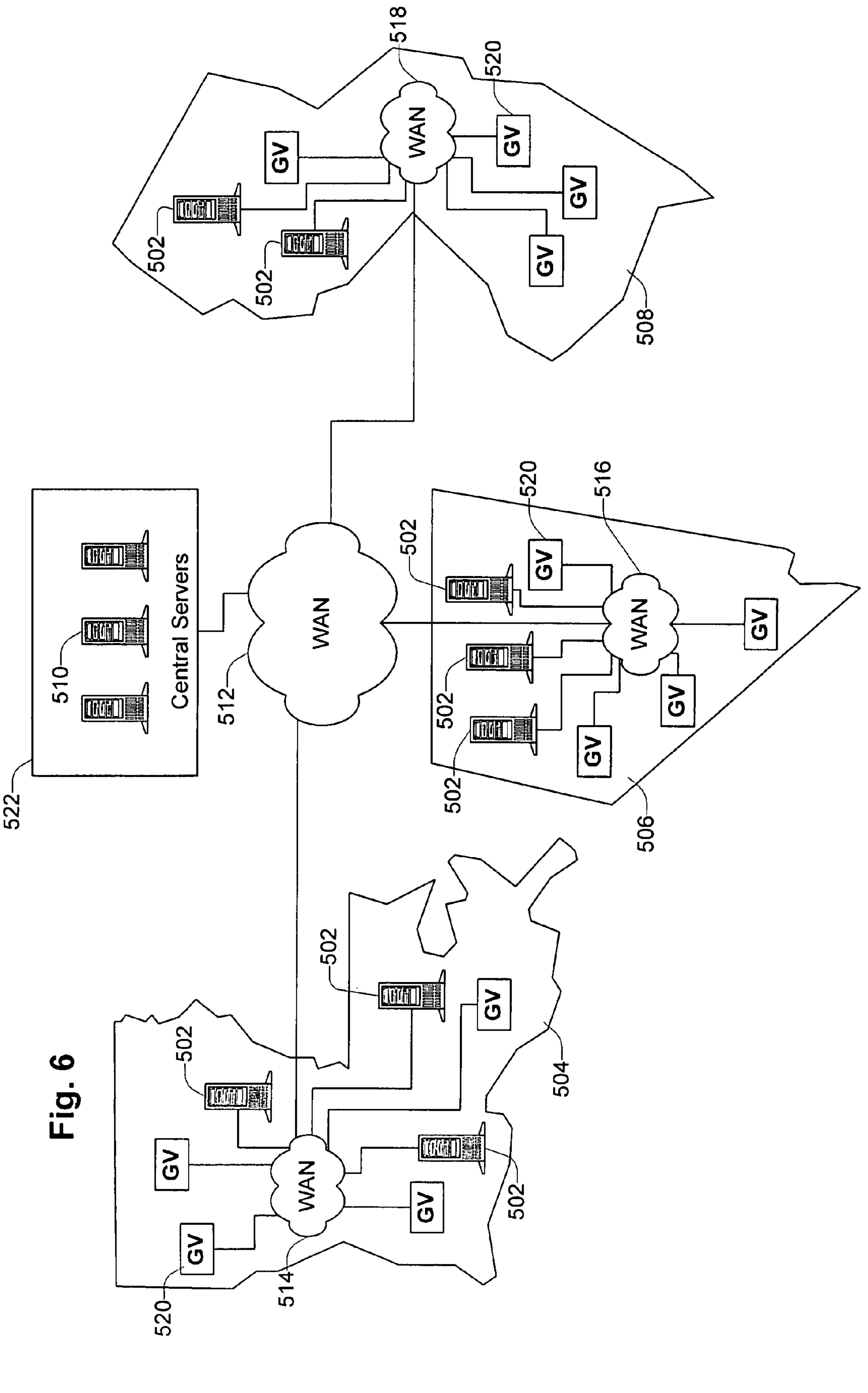
FIG. 6 is a block diagram of a wide area network in which yet another specific embodiment of the present invention may be implemented.
Figure 7:
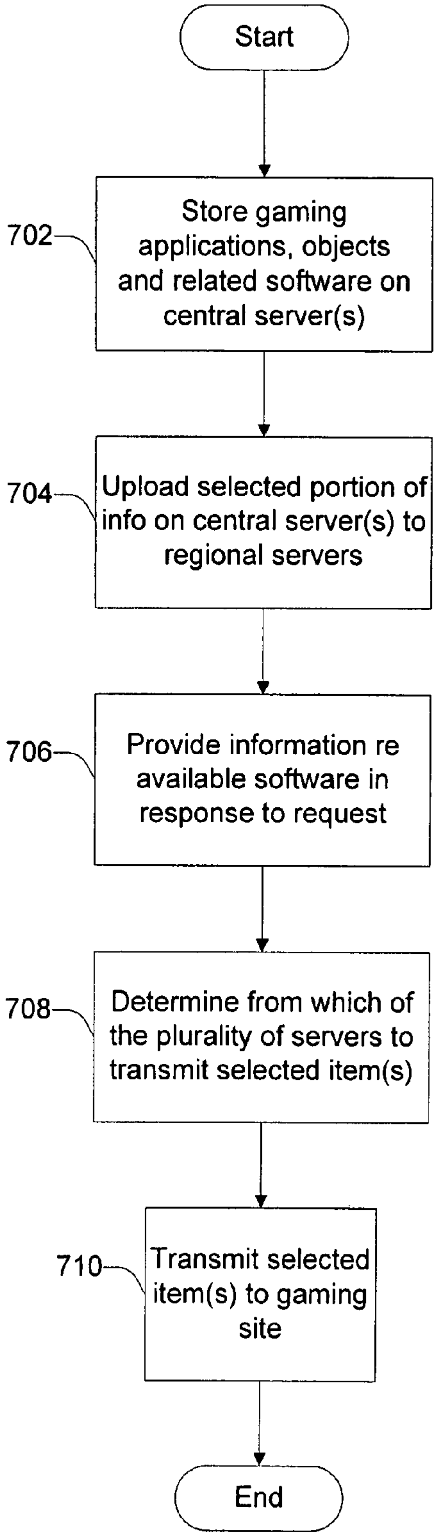
FIG. 7 is a flowchart illustrating operation of specific embodiments of the invention in the network environments of FIGS. 5 and 6.

FIGS. 5 and 6 are block diagrams of wide area networks in which other specific embodiments of the present invention may be implemented. FIG. 7 is a flowchart illustrating operation of the specific embodiments of the invention which may be implemented in the network environments of FIGS. 5 and 6. According to these embodiments, one or more regional servers 502 are provided in each of a plurality of gaming jurisdictions 504, 506, and 508 in which different regulatory schemes are in place. The gaming applications, data files, software objects, and gaming related software which have been approved or are specifically appropriate in each jurisdiction are uploaded from one or more central servers 510 to the corresponding regional server(s) 502 via WANs 512, 514, 516, and 518.

Authorized personnel from each of the gaming venues 520 in a particular jurisdiction may then log on to a regional server in their gaming jurisdiction for the purpose of downloading gaming applications and related software. According to various embodiments, gaming venues may also log directly onto central server(s) 510 to effect such downloads as discussed above with reference to FIGS. 3 and 4. For example, a gaming venue in New Jersey (region 508) could log onto one of the regional servers 502 via WAN 518, or central server(s) 510 via WANs 512 and 518.

Server(s) 510 may be located at one or more facilities 522 operated by, for example, a gaming application provider such as IGT of Reno, Nev. Gaming venues 520 may comprise any of a variety of gaming providers such as, for example, casinos or any other "brick and mortar" gaming venue, or virtual venues such as gaming sites on the Internet or World Wide Web.

Providing gaming applications and related software on regional servers provides a convenient mechanism for segregating downloadable content such that only the applications and content appropriate for a particular jurisdiction are available in that jurisdiction. It also distributes the bandwidth requirements for downloading such information in a way that avoids the undesirable bottleneck issues inherent in having fewer download options. That is, if all of the available downloadable information is located in one or more servers at a single location (e.g., server(s) 510 at a single facility 522), all requests for such information and all transfers of the typically large files (sometimes on the order of gigabytes) must occur through relatively few (conceivably one) communication links. Not only does this present issues with regard to bandwidth, there are also significant reliability drawbacks, i.e., if the servers or the links fail, access to the information is cut off.

In addition, and according to the embodiment illustrated in FIG. 6, having multiple regional servers in each gaming jurisdiction further enhances the efficiency and reliability of such a system. That is, servicing of the requests in a particular region may be distributed among the servers located in that region. In addition, given the number of download options in such an embodiment, multiple link and server failures would have to occur simultaneously to completely cut off access to the downloadable content in a given jurisdiction.

According to some embodiments, the selection of one of a plurality of regional or central servers may be accomplished automatically, e.g., without requiring input from the requesting user at the gaming venue. There are a wide variety of request routing, load balancing, and traffic redirection techniques which may be employed to redirect such requests to the appropriate server. Therefore, any networking technology mechanism which could effect the automatic selection of one of a plurality of servers for handling such a request should be understood to be within the scope of the present invention.

Alternatively and according to other embodiments, the requesting user may be given the option of selecting one of a plurality of servers from which to download desired software much like similar options in peer-to-peer file sharing applications. That is, in response to a request to view downloadable items, a web page could be presented to the requester in which a number of download options are presented (e.g., as shown in Table I).

TABLE I

| Game | Available Transfer Server | Size | Time to Download |
|---|---|---|---|
| Little Green Men | IGT Main | 3000 MB | 00:30 min |
| Little Green Men | IGT Louisiana | 3000 MB | 01:30 min |
| Little Green Men | IGT New Jersey | 3000 MB | Not Available |
| Little Green Men | IGT Mississippi | 3000 MB | 00:20 min |

As shown, the options presented may include information regarding the size and time to download particular objects or applications. According to specific embodiments, these parameters may even be updated to reflect actual available bandwidth and/or current data traffic conditions and constraints.

Referring now to FIG. 7, gaming and gaming-related applications and software objects are provided on one or more central servers for distribution to any of a plurality of regional servers in any of a plurality of gaming jurisdictions (702). Selected portions of the information stored on the central server(s) are uploaded to each of the regional servers (704). According to specific embodiments of the invention, the selected portions are determined with reference to the regulatory scheme associated with the gaming jurisdiction in which each regional server is located. That is, only those portions of the information approved for distribution in a particular gaming jurisdiction are made available on the servers in that jurisdiction.

In response to a request from a first gaming venue in a first gaming jurisdiction, information relating to available gaming applications, objects and related software is provided to the requester at the gaming venue via an intervening WAN (706). According to various embodiments of the invention, this information may be provided from any of the regional servers associated with the gaming jurisdiction from which the request originated. Alternatively, this information may be provided, for example, directly from any central server(s) associated with the gaming application provider or some other intermediate server. According to a specific embodiment, the information provided to the requester may identify a plurality of download options for one or more gaming applications or related software as shown, for example, in Table I. As mentioned above, the communication protocol according to which information is transmitted back and forth between the central server(s) and the gaming venues may be any of a wide variety of well known or proprietary protocols.

In response to selection of one or more gaming applications or software objects for download by the user at the gaming venue, it is determined from which of a plurality of servers or server interfaces to transmit the requested applications/objects (708). As discussed above and for example, this determination may occur automatically according to the location from which the request originated, or a load balancing scheme which causes the request to be serviced based on current bandwidth conditions. Alternatively, the determination may be made in response to selection of a particular server option by the requesting user as discussed above with reference to Table I. It should be noted that various embodiments of the invention contemplate that the information to be downloaded may be distributed from any of the regional server associated with the jurisdiction from which the request originated, or the central server(s).

Regardless of how this determination is made, the selected item(s) is/are transmitted from one of the regional or central servers to the gaming venue (710) to be stored, for example, in a game data repository (e.g., GTDR 100 of FIG. 1) for distribution to one or more gaming terminals, or on one or more servers which provide gaming applications over a network, e.g., Internet gaming. In the case where the information is being transmitted from a central server and as discussed above, access to the downloadable information on the central server(s) may be controlled according to the regulations of the gaming jurisdiction in which the gaming venue from which the request was generated is located.

According to various embodiments, each gaming customer has an account with the game distribution system for purchasing the games which are downloaded according to the invention. In addition to controlling access to information according to a regulatory scheme, the system may organize and present available gaming applications to the user in a variety of ways relating, for example, to how new or popular a particular game is. In cases where the number of available games is large, searching capabilities may also be provided so that the customer can search the available games according to, for example, name, type, theme, description, etc.

According to various embodiments, access to resources related to the gaming applications may also be provided in a way that is closely coupled to each gaming application. Such resources might include, for example, available game customizations (e.g., bonus games, paytables, etc.), demonstrations of available games, current ratings of available games, customer feedback bulletin boards relating to available games, game related chat rooms, live and prerecorded web casting conferences for customer training, new game introductions, and other announcements, etc.

As with the gaming applications and other software, access to these resources may be controlled in accordance with, for example, the applicable regulatory scheme. In addition, access to such resources may be determined according to the application(s) being currently presented, or in response to selections made by the requester. So, for example, if the requester selects the IGT game "Little Green Men," related resources are automatically presented to the requester which may include, for example, the options shown below:

Little Green Men Game Web Casting
- Available Bonus Games
- Game Demonstrations
- Training
- Announcements Little Green Men Bulletin Board
Little Green Men Game Ratings
Little Green Men Chat Room Each of these lines of text could be, for example, a hyperlink which, if selected, results in presentation of the selected resource to the user.

Figure 8A:
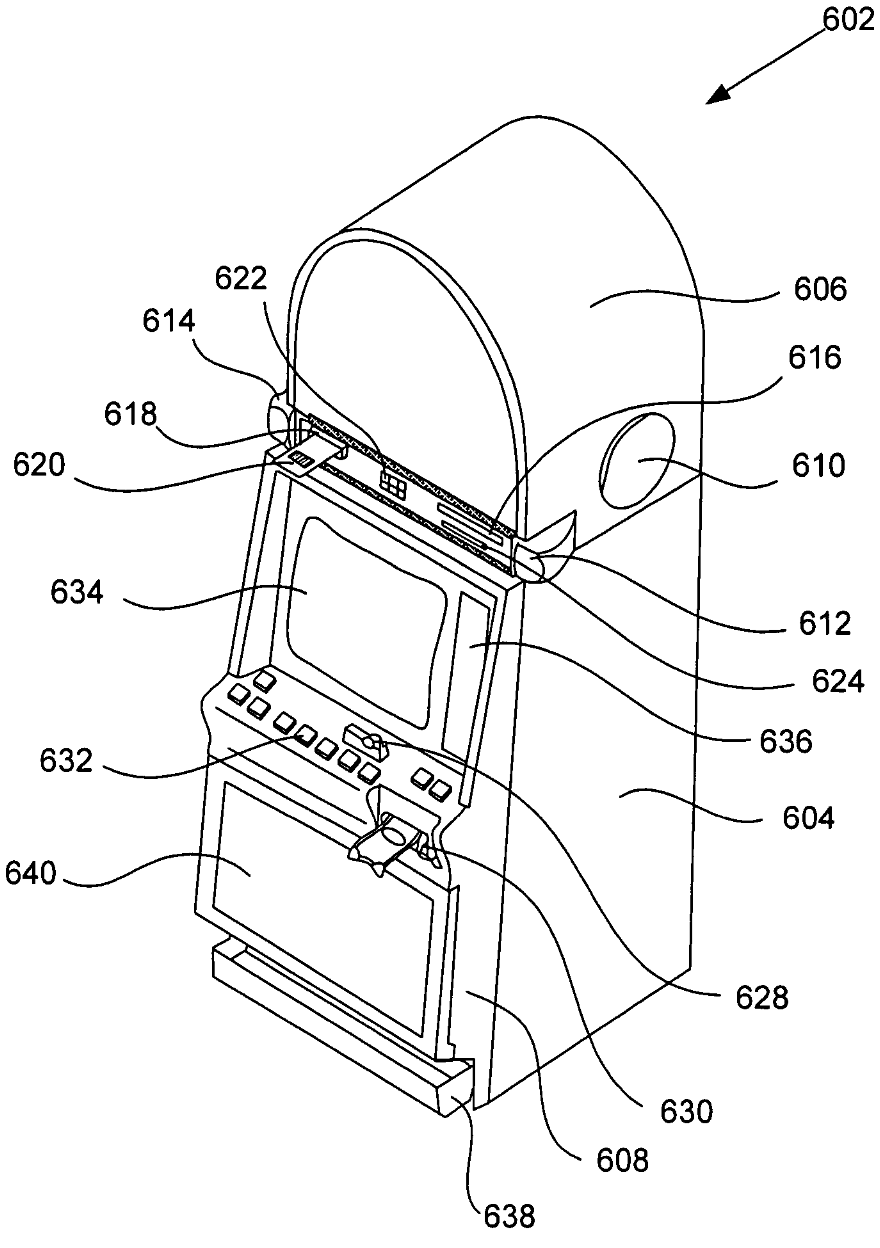
FIG. 8A is a perspective drawing of a gaming machine having a top box and other devices.

FIG. 8A is a perspective drawing of a gaming machine 600 having a top box 606 and other devices. Gaming machine 600 includes a main cabinet 604, which generally surrounds the machine interior (not shown) and is viewable by users. The main cabinet includes a main door 608 on the front of the machine, which opens to provide access to the interior of the machine. Attached to the main door are player-input switches or buttons 632, a coin acceptor 628, and a bill validator 630, a coin tray 638, and a belly glass 640. Viewable through the main door is a video display monitor 634 and an information panel 636. The display monitor 634 will typically be a cathode ray tube, high resolution flat-panel LCD, or other conventional electronically controlled video monitor. The information panel 636 may be a back-lit, silk screened glass panel with lettering to indicate general game information including, for example, a game denomination (e.g. $0.25 or $1). The bill validator 630, player-input switches 632, video display monitor 634, and information panel are devices used to play a game on the game machine 602. The devices are controlled by circuitry (e.g. the master gaming controller) housed inside the main cabinet 604 of the machine 602. Many possible games, including mechanical slot games and video games of chance including video slot games, video poker, video blackjack, video pachinko, video card games, video bingo, video keno, video checkers and video lottery, may be provided with gaming machines of this invention.

The gaming machine 602 includes a top box 606, which sits on top of the main cabinet 604. The top box 606 houses a number of devices, which may be used to add features to a game being played on the gaming machine 602, including speakers 610, 612, 614, a ticket printer 618 which prints bar-coded tickets 620, a key pad 622 for entering player tracking information, a florescent display 616 for displaying player tracking information and a card reader 624 for entering a magnetic striped card containing player tracking information. The ticket printer 618 may be used to print tickets for a cashless ticketing system. Further, the top box 606 may house different or additional devices than shown in FIG. 6A. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 604 of the machine 602.

Understand that gaming machine 602 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 8A, when a user wishes to play the gaming machine 602, he or she inserts cash through the coin acceptor 628 or bill validator 630. Additionally, the bill validator may accept a printed ticket voucher which may be accepted by the bill validator 630 as an indicia of credit when a cashless ticketing system is used. At the start of the game, the player may enter playing tracking information using the card reader 624, the keypad 622, and the florescent display 616. Further, other game preferences of the player playing the game may be read from a card inserted into the card reader. During the game, the player views game information using the video display 634. Records of these transactions may be transmitted from the gaming machine 600 to a GTDR.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 632, the video display screen 634 or using some other device which enables a player to input information into the gaming machine. In some embodiments, the player may be able to access various game services such as concierge services and entertainment content services using the video display screen 634 and one more input devices.

During certain game events, the gaming machine 602 may display visual and auditory effects that can be perceived by the player. These effects add to the excitement of a game, which makes a player more likely to continue playing. Auditory effects include various sounds that are projected by the speakers 610, 612, 614. Visual effects include flashing lights, strobing lights or other patterns displayed from lights on the gaming machine 602 or from lights behind the belly glass 640. After the player has completed a game, the player may receive game tokens from the coin tray 638 or the ticket 620 from the printer 618, which may be used for further games or to redeem a prize. Further, the player may receive a ticket 620 for food, merchandise, or games from the printer 618.

Figure 8B:
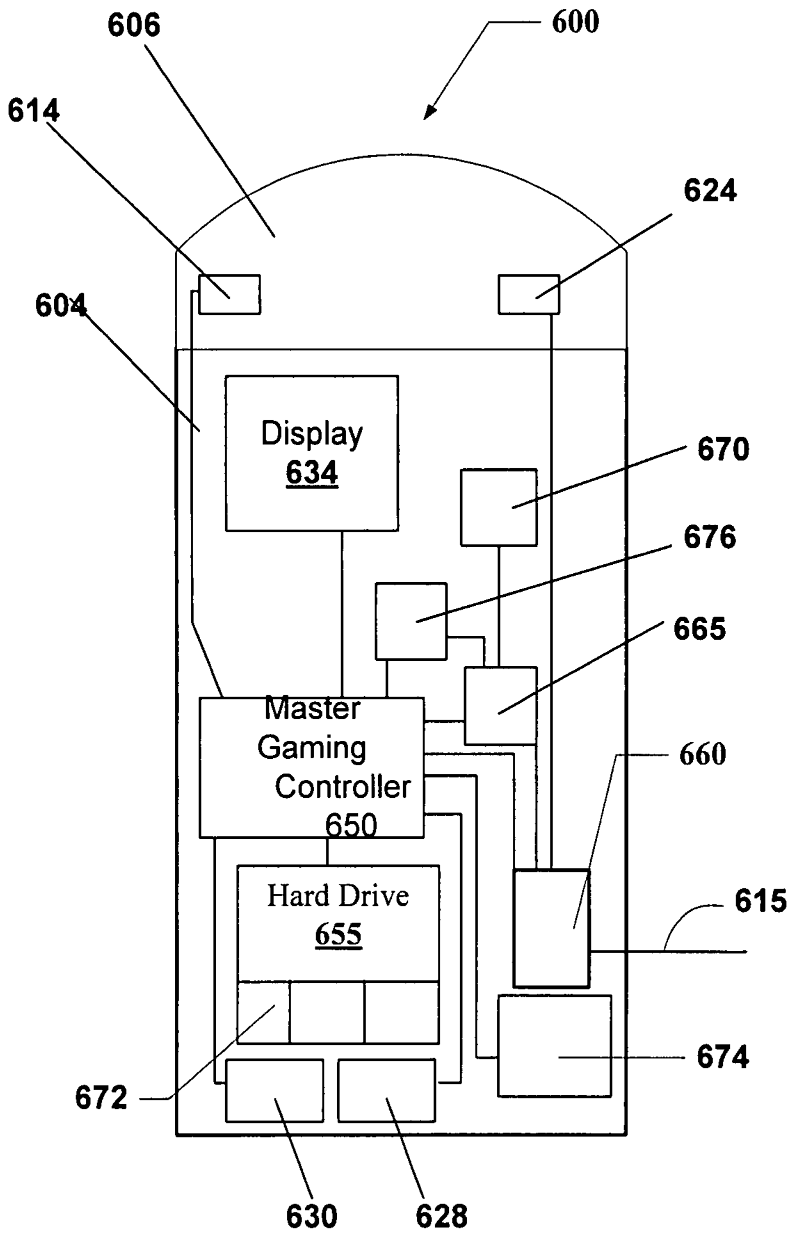
FIG. 8B is a block drawing of gaming components in a gaming machine.

FIG. 8B is a block diagram of components within a gaming machine 600 that may be used with the present invention. The game software components may be game system components (e.g. communication protocols, device drivers, event managers, etc.), game paytables, game bonusing, game graphics, game sounds, game progressives, game jurisdiction information and game networking. For example, the device drivers may allow communication between the master gaming controller 650 and a number of devices controlled by the master gaming controller 650 including the bill validator 630, the coin acceptor 628, the card reader 624 and the speaker 614. The game software components may be stored on a CD accessed using a CD-drive 674, a hard drive 655, a hard drive with a game software component partition 672 or other types of memory (not shown) including an EPROM, a flash memory, a ROM, a RAM, a DVD, a tape drive or non-volatile memory. In addition, game software version information corresponding to game software components stored on the gaming machine may also be stored in a memory of some type on the gaming machine.

The master gaming controller 650 may utilize processor logic to combine various game software components, as previously described, to present a game on the gaming machine. To alter the game play on a gaming machine, the master gaming controller 650 may receive game software components from a remote server such as a GTDR. For instance, using a first combination of game software components on the gaming machine, the master gaming controller may present a game presentation with a particular set of graphics and sounds. As described with reference to FIGS. 1 and 2, game software components with new graphics and new sounds may be downloaded to the gaming machine from the GTDR. The master gaming controller 650 may combine game software components from the first combination with the new graphical game software components and the new audio game software components to create a second combination of game software components. The second combination of game software components may be used to present a game on the gaming machine with the new graphics and sounds. Thus, as different game software components are downloaded from the GTDR, different combinations of game software components allowing different game play features may be generated by the master gaming controller 650.

The master gaming controller may communicate with a remote server such as a GTDR via a network interface on the main communication board 660 and the LAN 615. The LAN 615 may be an intranet, such as a casino area network, a cashless system network, a progressive game network, an accounting network and a bonus game network, or a wide area network, such as the Internet. To establish communications between the gaming machine 600 and the remote server, a wireless communication interface 670 such as a wireless modem connected to an antenna may be used or a wired communication interface, such as wired modem 676 connected to a phone line or Ethernet connection, may be used. To enable communications between the remote server and the gaming machine, a communication protocol such as TCP/IP may be used.

Illegal access to the gaming machine 600 may be prevented using the internal firewall 665. The internal firewall 665 is designed to prevent someone such as a hacker from gaining illegal access to the gaming machine and tampering with it in some manner. For instance, an illegal access may be an attempt to plant a program in the gaming machine that alters the operation of the gaming machine or allows someone to steal data. Firewalls used in the gaming machine may be provided by CISCO Systems (San Jose, Calif.).

Figure 9:
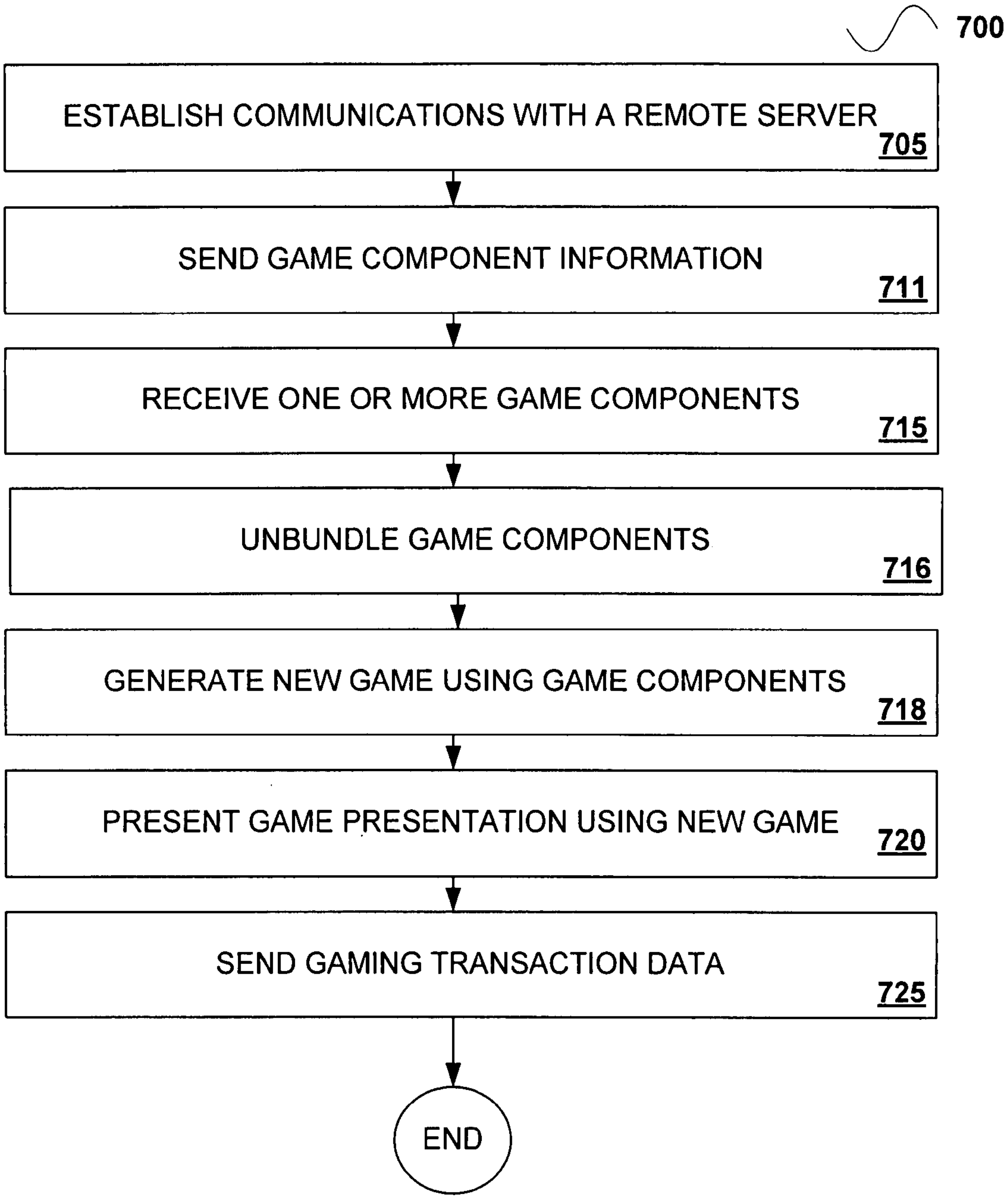
FIG. 9 is a flow chart depicting a method of updating game software components on a gaming machine using a remote server.

FIG. 9 is a flow chart depicting a method of updating game software components on a gaming machine using a remote server 700. In 705, communications are established with the remote server which may be a GTDR. The communications may be initiated by the gaming machine or by the remote server using an appropriate communication protocol such as TCP/IP. The gaming machine may establish communications with the remote server by contacting an ISP to establish an Internet connection. In 710, the gaming machine may send game software component information, such as a list of game software components currently being used on the gaming machine, a list of game software components stored on the gaming machine or game software component version information, to the remote server. In 715, the gaming machine may receive one or more game software components from the remote server where a plurality of game software components are used to present a game on the gaming machine. The game software components may include game system components, game paytables, game bonusing, game progressives, game graphics, game sounds, game jurisdiction information and game networking components.

In 716, the gaming machine may unbundle the game software components. In the unbundling process, the game software components may be decrypted, may be uncompressed, may be checked for viruses and may be reassembled from multiple components. After the new game software components are unbundled, in 718, a new combination of game software components may be assembled. The combination of game software components may include game software components received from the remote server as well as game software components previously stored and utilized on the gaming machine. When the downloaded game software components are used, the downloaded game software components may add additional or new game play features to a game presented on the gaming machine. In 720, the new combination of game software components may be used to present a game on the gaming machine. In 725, gaming transaction information generated from game play on the gaming machine may be sent to the remote server. The gaming transaction data may be sent at any time while communications are established with the gaming machine and is not limited to the sequence presented in the figure.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to software applications which are eventually run on gaming terminals as part of game play by an end user. It will be understood, however that the scope of the present invention includes distribution of a larger array of gaming related software and objects such as, for example, applications which facilitate management and control of gaming applications and gaming venues themselves. In addition, the specific hardware and network topologies to which the present application alludes are merely exemplary and should not be used to limit the scope of the invention. Rather, any variations or alternatives implementations which are apparent to a person of ordinary skill in the art of network technology are also included.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for distributing gaming applications to a plurality of gaming sites located in a plurality of regulatory regions via a wide area network, the plurality of regulatory regions associated with a plurality of corresponding regulatory schemes, the method comprising:

storing a plurality of gaming applications on at least one central server wherein the gaming applications include versions of gaming software of a base game application designed or configured for one or more of i) determining a game outcome for a game played on a gaming terminal; ii) determining a value amount available for dispensation based upon a wager made on the game and based upon the determined game outcome wherein the value amount is determined via execution of the gaming software; or iii) displaying the game outcome at the gaming terminal via execution of the gaming software on the gaming terminal, wherein the plurality of gaming applications includes a plurality of versions of the base gaming application corresponding to the plurality of regulatory schemes;

selecting first and second versions of the base gaming application from the plurality of versions, wherein the first version is specific to a first regulatory scheme, and the second version is specific to a second regulatory scheme; and downloading the first and second versions from the at least one central server to respective first and second gaming sites located in respective first and second regulatory regions via the wide area network, wherein the first regulatory region is associated with the first regulatory scheme and the second regulatory region is associated with the second regulatory scheme, and wherein the first version is only appropriate for use in the first regulatory region and the second version is only appropriate for use in the second regulatory region.

2. The method of claim 1 wherein downloading the first and second versions comprises:

uploading the first version to at least one regional server associated with the first regulatory region; and downloading the first version from the at least one regional server to the at least one gaming site.

3. The method of claim 2 wherein the at least one regional server comprises a plurality of regional servers.

4. The method of claim 3 further comprising receiving a request for a portion of a subset of gaming applications from the at least one gaming site.

5. The method of claim 1 wherein downloading the first version comprises determining the first version with reference to a representation of the regulatory scheme associated with the first regulatory region.

6. The method of claim 5 wherein determining the first version comprises selecting software objects associated with the gaming applications.

7. The method of claim 1 wherein the first version comprises a first combination of software objects associated with the plurality of gaming applications, and the second version comprises a second combination of software objects associated with the plurality of gaming applications, wherein the first combination of software objects is different from the second combination of software objects.

8. The method of claim 1 further comprising:

in response to a request for a first one of the gaming applications from a first one of the gaming sites, presenting a plurality of software objects associated with the first gaming application thereby enabling selection of a combination of the software objects by a user at the first gaming site.

9. The method of claim 1 wherein each of the gaming applications comprises a combination of a plurality of software objects.

10. The method of claim 9 wherein the plurality of software objects includes at least some of base game applications, pay tables, display data, and bonus game options.

11. The method of claim 1, wherein the game played on the gaming terminal is selected from the group consisting of a slot game, a bingo game, a card game, a lottery game, a keno game and a checkers game.

12. The method of claim 1, wherein the gaming terminal is one of a portable device or a home computer.

13. A system for distributing gaming applications to a plurality of gaming sites located in a plurality of regulatory regions via a wide area network, the plurality of regulatory regions associated with a plurality of corresponding regulatory schemes, the system comprising:

at least one central server for storing a plurality of gaming applications wherein the gaming applications include versions of gaming software of a base game application designed or configured for one or more of i) determining a game outcome for a game played on a gaming terminal; ii) determining a value amount available for dispensation based upon a wager made on the game and based upon the determined game outcome wherein the value amount is determined via execution of the gaming software; or iii) displaying the game outcome at the gaming terminal via execution of the gaming software on the gaming terminal, wherein the plurality of gaming applications includes a plurality of versions of the base gaming application corresponding to the plurality of regulatory schemes;

wherein the at least one central server is operable to do the following:

select first and second versions of the base gaming application from the plurality of versions, wherein the first version is specific to a first regulatory scheme, and the second version is specific to a second regulatory scheme; and download the first and second versions from the at least one central server to respective first and second servers at respective first and second gaming sites located in respective first and second regulatory regions via the wide area network, wherein the first regulatory region is associated with the first regulatory scheme and the second regulatory region is associated with the second regulatory scheme, and wherein the first version is only appropriate for use in the first regulatory region and the second version is only appropriate for use in the second regulatory region;

the first server configured to store the first version of the gaming software wherein the first server is operable to distribute the first version of the gaming software to at least the gaming terminal; and the gaming terminal operable to receive the first version of the gaming software from the first server and at least operable to i) execute the first version of the gaming software to generate a first game outcome, ii) determine a first value amount available for dispensation from the gaming terminal, iii) execute the first version of the gaming software to display the game outcome on the gaming terminal or iv) combinations thereof.

14. The system of claim 13, wherein the game played on the gaming terminal is selected from the group consisting of a slot game, a bingo game, a card game, a lottery game, a keno game and a checkers game.

15. The system of claim 13, wherein the gaming terminal is one of a portable device or a home computer.

16. An apparatus for distributing gaming applications to a plurality of gaming sites located in a plurality of regulatory regions via a wide area network, the plurality of regulatory regions associated with a plurality of corresponding regulatory schemes, the apparatus comprising:

a memory configured to store a plurality of gaming applications on at least one central server wherein the gaming applications include versions of gaming software of a base game application designed or configured for one or more of i) determining a game outcome for a game played on a gaming terminal; ii) determining a value amount available for dispensation based upon a wager made on the game and based upon the determined game outcome wherein the value amount is determined via execution of the gaming software; or iii) displaying the game outcome at the gaming terminal via execution of the gaming software on the gaming terminal, wherein the plurality of gaming applications includes a plurality of versions of the base gaming application corresponding to the plurality of regulatory schemes; and a logic device operable to do the following:

select first and second versions of the base gaming application from the plurality of versions, wherein the first version is specific to a first regulatory scheme, and the second version is specific to a second regulatory scheme; and download the first and second versions from the at least one central server to respective first and second gaming sites located in respective first and second regulatory regions via the wide area network, wherein the first regulatory region is associated with the first regulatory scheme and the second regulatory region is associated with the second regulatory scheme, and wherein the first version is only appropriate for use in the first regulatory region and the second version is only appropriate for use in the second regulatory region.

17. The apparatus of claim 16, wherein the game played on the gaming terminal is selected from the group consisting of a slot game, a bingo game, a card game, a lottery game, a keno game and a checkers game.

18. The apparatus of claim 16, wherein the gaming terminal is one of a portable device or a home computer.

* * * * *